May 17, 1938. R. U. CLARK Re. 20,727

ELECTRON DISCHARGE DEVICE

Original Filed Sept. 2, 1932

INVENTOR.
Richard Urann Clark

Reissued May 17, 1938

Re. 20,727

UNITED STATES PATENT OFFICE 20,727

ELECTRON DISCHARGE DEVICE

Richard U. Clark, Fort Wayne, Ind.

Original No. 2,084,478, dated June 22, 1937, Serial No. 631,461, September 2, 1932. Application for reissue January 5, 1938, Serial No. 183,562

16 Claims. (Cl. 250—27.5)

Figure 1:
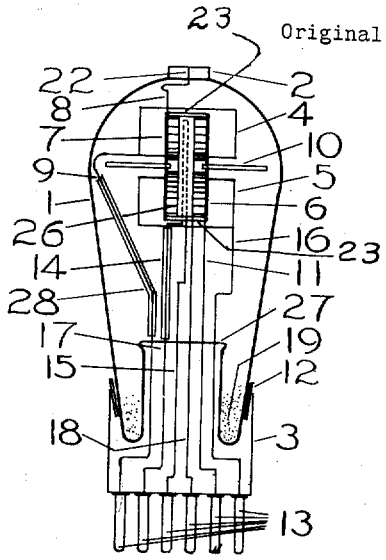

The present invention embodies in one tube or envelope the elements and parts necessary to provide for the generation or by-passing of considerable amounts of electric current, of an alternating or pulsating nature, when properly excited by direct and/or alternating current thru suitable connections to a wide variety of external circuits.

The present device is of the type known as an electron discharge or vapor electric tube. It employs a single or common cathode with a plurality of associated grids or anodes, or both, not more than two of either being shown in the appended drawing, but all being so arranged that they may work independently of each other and without interference but operating by virtue of the electrons given off by a common cathode. The use of a single or common cathode as a source of electrons effects a very great saving in the amount of cathode excitation required for satisfactory operation, and due also to the compact construction thus made possible the temperature rise within the tube, which helps to vaporize certain alkali metals such as caesium, rubidium, sodium, potassium, or the like, which are introduced into the tube in various amounts and combinations in order to obtain a very low voltage drop between anode and cathode within the tube, will be enhanced due to the compact structure.

One of the objects of the present invention is to provide a novel construction of vapor electric tube employing a readily ionizable atmosphere, in combination with a common electron emitting means, a plurality of associated grids and anodes and means permitting a free and controlled flow of electrons from substantially the entire surface of the emitting means.

Another object of the invention is to provide a novel vapor electric tube having a common cathode or electron emitting means in combination with multiple grid and anode elements, and an apertured spacer encompassing the cathode or electron emitting means and so constructed and arranged as to permit a free and complete flow of electrons from the entire extent of, or surface area of, the electron emitting means.

A still further object of the present invention is to provide a novel tube construction having a common cathode or electron emitting means, multiple grids and anodes and a spacer encompassing the cathode or electron emitting means, all so shielded, constructed, arranged and correlated as to provide a novel combination of tube of the vapor electric, multiple type. So far as I am aware I am the first to conceive and disclose a tube which accomplishes the foregoing object.

To completely understand the novel functions and constructions of the present device, it will be necessary to consider in detail all of the factors which affect the operation of tubes of this general type, both favorably and unfavorably, and these factors are outlined in what follows.

In an electronic tube of the ionized vapor type such as shown and described here, and especially so in the types considered using alkali vapors to obtain anode to cathode voltage drops as low as 1½ volts or less, there is very great danger of glow interference between electrodes and arcing back from anode to anode. There is also a chance that arcing or current flow may take place from anode to grid between tube sections desired to be kept separate in their electrical relations to each other, but which must be of necessity closely spaced from each other mechanically.

The tendency for electrical leakage between parts within the tube is largely due to the fact that there is a considerable attraction or field set up by the glass walls of the tube and certain other parts, which ordinarily causes considerable spread of ionization within the tube. This often leads to the forming of arcs between unwanted electrodes.

The grid or grids of the present device may carry alternating or pulsating current as well as the anodes, and said grids may often reach materially higher potential values than the anodes, although the reverse is more apt to be the case. In the event sufficient potential difference in the right polarity exists between a grid in one tube section and an anode in a totally different section, there would exist a condition tending to form an arc between the two unless they were properly shielded from each other. This is especially true if the grid is operating at high temperature and the tendency would be very pronounced if caesium or the like is used within the tube.

The problem of proper shielding within the tube becomes still more difficult when it is desired to utilize, up to the total emission of the cathode, or nearly so, peak flows of current from one anode and then another as often as many hundred times a second. Such operation is desired and is obtained in practice in the invention now being outlined. This calls for complete ionization of the space around the entire active surface of the cathode or electron emitting means in order to overcome the space charge effect. During such ionization, current can be made to flow through certain desired paths which could not normally be followed by electrons alone, and yet the ions which make possible such diverse current paths must be kept within control in order that the entire cathode emission may be employed to carry full current between it and one anode.

In the present novel construction the effects just outlined are accomplished as is proven by the fact that when the tube is used as a single wave rectifier alone the average anode current remains nearly the same when either one anode alone, or many anodes in parallel are connected to the source of current to be rectified.

Figure 2:
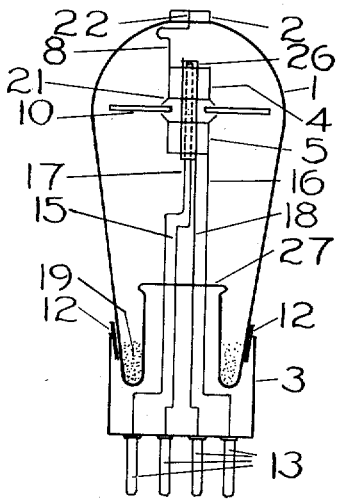
Figure 3:
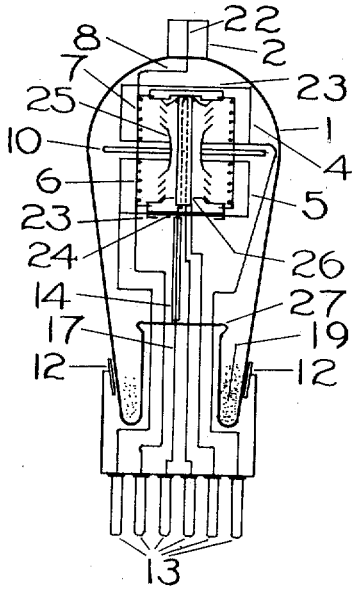

In the drawing, Figs. 1, 2, and 3 are diagrammatic views in side elevation of alternate forms of the novel tube construction.

The manner in which various currents are kept separate within the tube and ionization is kept within control is best understood by a consideration of the tube structure shown in Fig. 1. In this figure, a common cathode or electron emitting means is shown at 26, within the tube 1, heater excitation being supplied through the wire leads 15, and 17. This cathode 26, may be heated either as a filament or indirectly as shown, the latter method being preferred. Such indirect heating is standard practice today and is therefore not described in detail.

The midportion of the cathode or common electron emitting means 26 is encircled by one or more mica, ceramic or other types of non-conducting washers 10, having a diameter greater than the outside diameter of the anodes. This washer 10, acts as a screen or baffle to prevent stray arcs between adjacent tube sections. This insulating washer or spacer also acts to center the grids 6 and 7 and may also anchor the plates in position as in Fig. 2.

The hole at the center of the above mentioned spacers or baffles allows just sufficient clearance around the cathode or electron emitting means to permit a free flow of electrons and ions from one end of the cathode to the other. However, the various grids abut the mica baffles in such a way that no undesired leakage of glow or ionized vapor may take place between undesired sections. This is made possible by keeping the width of grid mesh correct throughout the tube, and where extreme shielding is needed a further precaution is taken by narrowing the openings between grid turns as the center of the cathode is approached.

Where the grid spacing is varied as just mentioned the current flow tends to take place through a longer path than might ordinarily be the case with an evenly spaced grid. It is well known that the grid in the present type of tube has control up until the time that the arc is struck within the tube. In the present invention, the path and density of the arc, especially in tubes having a very low anode to cathode drop, can be kept under control by properly designing the grids and correctly shielding the plates of the tube, or anodes as they are generally known. For medium and high voltage operation, complete shielding as with shields 23 and 24 at the end of the electrodes or elements, is desired. In tubes operating at relatively high voltages a variation in grid spacing might tend to cause arcing entirely through the largest mesh of the grid. This would cause what is known as a hot spot and would quickly ruin the cathode. This is not so apt to be the case in tubes having an anode to cathode drop of 9 volts or below, especially where the variation of the grid spacing is sufficiently gradual.

In all present tubes of the ionized vapor type where a single cathode or common electron emitting means is used in conjunction with more than one anode, the spacing between the various groups of grids and anodes, or anodes, if grids are not used, is made as great as possible, as is also their spacing from the cathode to prevent undesired interaction. In the present invention however all parts are bunched as close together as possible in order to keep the anode to cathode drop as low as possible, which cannot be done where wide spacing is employed.

Considering now in detail the structure of the tube shown in Fig. 1, I provide a properly evacuated and sealed glass bulb 1, with a number of lead wires passing through the glass stem of the tube, or press as it is known, said press being numbered 27. Within this tube is a cathode which may be of the oxide coated type, of caesiated metal, or of any type known to the art which is suitable for use with caesium and mercury vapor or the like.

Surrounding the cathode 26 are the grids 7 and 6, the former being connected by the lead wire 8, to the metal terminal cap 2 at the point 22 where the lead wire passes through the glass bulb. The grid 6 is terminated by the lead wire 11. Both of these grids abut against the mica or other insulating spacer or washer 10, the grid support rods being impressed somewhat into the mica to which they act as a support and centering member, while the washer in turn helps to stay the grids. The grids should be poor emitters.

Surrounding the grids just mentioned are the plates or anodes 4 and 5. These should be of material best suited for vapor electric devices. Molybdenum and various high melting point alloys containing a percentage of chromium have been found fairly satisfactory. The carbonized type of plate or anode is also desirable. Chromium titanium alloys and the like are satisfactory as grid material. A low rate of emission in the presence of alkali vapors is desired as in many cases the grids run at very high temperatures. The general structure of the grids and plates may be very similar to that used for the inner screen of the present screen grid tube and the present day plate or anode, except for the use of a variable grid mesh in some cases. Such structures are quite satisfactory for tubes up to several watts capacity where internal voltages between anode and cathode do not exceed eight or nine volts.

In Fig.1 an anode lead 9, and a heater lead 17, are shown as insulated through the greater or entire portion of their length by the coverings 28 and 14, respectively. This insulation may be in the form of glass tubing or some type of ceramic, either moulded or sprayed on the leads and properly treated to be gas free, and is especially needed or desirable in tubes where the voltage drop from anode to cathode is of the order of two or three volts or less.

The remaining anode lead 16 from the anode 5, passes through the base 3, as does the cathode lead 18, and these and the various other leads previously mentioned are soldered to the terminal pins 13. The base 3, is of the usual moulded insulating material such as is in common use today but instead of the tube being cemented directly to the base in the usual manner a ring of heat insulating material 12, such as asbestos or the like is placed between the tube and the base and can be cemented to both. This insulating ring 12, prevents the heat from the tube from spreading to the base too rapidly during the warming up of the device, when same is first put into operation, and thereby allows the bottom part of the tube to heat up rapidly causing the alkali vapor 19, which condenses to form a metal when cool, to increase the vapor pressure within the tube, which makes it possible to obtain the low voltage drop desired between anode and cathode. The leads mentioned above except for 22, are taken out of the bulb through the glass press or seal 27.

The type of tube shown in Fig. 2 is intended for use as a rectifier of alternating current or a by-pass for alternating or pulsating current. The general structure of the tube shown in Fig. 1 is maintained except that the grids are omitted and the anodes are stayed to the insulating spacer 18, by the feet 21. A large number of plates or anodes may be used around a single or common cathode in a tube of this nature when the same is intended to be used as a by-pass device, and in some such cases the shield spacers or washers 10, may be cut down materially in size. One particular use intended for this type of tube is as a multiple by-pass unit for radio receivers where it has been used by the present inventor to by-pass all points sufficiently above ground potential to conform with the internal tube drop. Points of unconforming potential are by-passed thru anode bleeders which add little resistance between anodes and by-pass points.

When used as a rectifier, the tube shown in Fig. 2 functions as economically as the oscillator tube shown in Fig. 1 the entire cathode furnishing electrons for each half of the rectified wave. By making use of this arrangement and type of construction nearly 50% is saved in cathode excitation. Where large amounts of energy or peculiar voltage wave forms are encountered and must be rectified, it may be found desirable to heat shield part of the cathode somewhat after the manner shown at 25, in Fig. 3. Where such a shield fits tightly through the hole in the insulating disk the entire cathode can be used for each half wave, and there can be no interference between the anodes except through the long path around the glass bulb, and this interference is prevented by properly shielding the anodes as previously stated. The cathode heat shield slots the inventor finds may even or equalize cathode heating throughout its length.

It has been found that by heat shielding the cathode 25 as in Fig. 3, the grid spacing can be kept constant under all conditions. Also the cathode operation becomes more efficient and the grids heat less. This type of tube has an advantage over that shown in Fig. 1 for high output or capacity. The grids in both Fig. 1 and Fig. 3 and their cathodes are closed in by the insulating shields 23 and 24, which may be recessed to help center the cathodes and shields. These heat shields are welded to the cathode so that the two become electrically common. This is designated by thickening the heat shield at the point where it ouches the cathode top in Fig. 3. In Figs. 1, 2, and 3, the heater coil is shown by dotted lines inside the cathode.

The tubes shown in Fig. 1 and Fig. 3 may both be used in typical gaseous triode oscillator circuits to generate alternating current from an applied direct current. The alternating current so generated within the tube may be transformed and rectified at various desired voltages within the same tube by application to the tube grids.

Having described the outstanding points of the present invention, what I claim and wish to protect is as follows:

1. A vapor electric tube having an ionizable atmosphere, two adjacent grids, two plates, and a common electron emitting cathode, an insulating spacer abutting the adjacent grids and having an aperture surrounding the cathode, said aperture having sufficient clearance thereabout to allow the passage of electrons and ions from one end of the cathode to the other whenever either grid prevents emission of electrons to its respective plate.

2. A vapor electric tube having an ionizable atmosphere, two adjacent grids, two plates, and a common electron emitting cathode, an insulating spacer abutting the adjacent grids and having an aperture surrounding the cathode, said aperture having sufficient clearance thereabout to allow the passage therethrough of the electrons and ions from one end of the cathode to the other whenever the charge on either grid prevents emission of electrons from the cathode, to its respective plate.

3. A vapor electric tube of the type employing two grids, two plates, and a common electron emitting cathode, an insulating spacer abutting the adjacent grids and provided with an aperture surrounding the cathode, said aperture having sufficient clearance thereabout to permit passage of the electrons and ions from one end of the cathode to the other whenever either grid prevents emission of electrons to its respective plate and heat insulation between the lead-in end of said tube and the base of the tube.

4. A vapor electric tube comprising an evacuated bulb containing an ionizable atmosphere, an electron emitting cathode, two grids, two plates, and an apertured disk-like non-conducting separating spacer having a diameter not less than the diameter of the plates, said grids enclosing the cathode and controlling the path of emission therefrom and positioned so as to abut the spacer and thereby shield one portion of the cathode from its remaining portion, so as to prevent the simultaneous external flow of electrons and ions from both ends of the cathode except through the aperture in the spacer, said aperture being of sufficient size and displacement to allow for the free flow of said cathode's emission therethrough as required in the operation of the device.

5. A vapor electric tube comprising an evacuated bulb containing an alkali metal and an ionizable gas, an electron emitting cathode, two grids, two anodes, and an apertured disk-like non-conducting separating spacer having a diameter not less than the diameter of said anodes, said grids enclosing the cathode and controlling the path of emission therefrom and positioned to abut the spacer and thereby shield one portion of the cathode from its remaining portion, so as to prevent the simultaneus flow externally of electrons and ions from both ends of the cathode except through the aperture in the spacer, said aperture being of sufficient size and displacement to allow for the free flow of said cathode's emission therethrough as required in the operation of the device.

6. A vapor electric tube of the type employing two grids, two plates, a common electron emitting heat shielded cathode, an insulating spacer abutting the adjacent grids and having an aperture surrounding the cathode, the aperture having sufficient clearance thereabout to permit the passage of the electrons and ions from one end of the cathode to the other through said aperture to supply emission from the entire cathode to the tube section controlling ionization.

7. In a vapor electric tube having an ionizable atmosphere, a plurality of grids and cooperating plates, an insulating spacer mounted intermediate said grids, a common cathode provided with a shield forming a part of the cathode mounted in said spacer and provided with openings for by-passing the flow of electrons and ions and for directing emission from substantially the entire surface of the common cathode to one plate at a time.

8. A vapor electric tube having a plurality of grids and plates, a common electron emitting means, an insulating spacer adjacent the grids provided with an opening and a shield for the emitting means mounted in said opening, said shield being provided with openings to permit the passage of electrons and ions from one end of the emitting means to the other and to supply emission to either plate.

9. A vapor electric tube of the type employing two grids, two plates, and a common electron emitting cathode, an insulating spacer adapted to be mounted intermediate said grids and having an aperture for the reception of said cathode, said aperture being of a size and displacement sufficient to by-pass the flow of electrons and ions from one portion of the cathode to the other and direct emission from substantially the entire surface of the common cathode to one plate at a time.

10. In a vapor electric tube of the type employing a readily ionizable atmosphere, two grids, two plates, and a common electron emitting cathode, an insulating spacer adapted to be mounted intermediate said grids and having an aperture for the reception of said cathode, said aperture being of a size and displacement sufficient to by-pass the flow of electrons and ions from one portion of the cathode to the other and direct emission from substantially the entire surface of the common cathode to one plate at a time.

11. A vapor electric tube of the type employing multiple grids and plates and a common electron emitting means, an insulating spacer adapted to be mounted intermediate adjacent grids and having an aperture for the reception of the electron emitting means, said aperture being of a size and displacement sufficient to by-pass the flow of electrons and ions from one portion of the electron emitting means to the other and direct emission from substantially the entire surface of the common electron emitting means to one plate at a time.

12. A vapor electric tube having a readily ionizable atmosphere comprising a plurality of grids and cooperating plates, and a common electron emitting cathode, an insulating spacer adapted to be mounted intermediate said grids and a by-passageway between sections of the cathode and within the periphery of the grids of a size and displacement sufficient to by-pass the flow of electrons and ions from one portion of the cathode to the other and direct emission from substantially the entire surface of the common cathode to one plate at a time.

13. A vapor electric tube of the type employing multiple grids and plates and a common electron emitting means, and means forming a passageway for by-passing the flow of electrons and ions and for preventing stray ionization between tube sections so as to direct emission from substantially the entire surface of the common electron emitting means to one plate at a time.

14. A vapor electric tube of the type employing multiple grids and plates and a common electron emitting means, and means within the tube and positioned intermediate the grids and plates forming a passageway for by-passing the flow of electrons and ions and for preventing stray ionization between tube sections so as to direct emission from substantially the entire surface of the common electron emitting means to one plate at a time.

15. A vapor electric tube of the type employing multiple grids and plates and a common electron emitting means, means mounted within the tube and forming a passageway for by-passing the flow of electrons and ions from one end of the electron emitting means to the other to make available and confine the entire cathode's emission to each plate at such times as its cooperating grid initiates ionization.

16. A vapor electric tube having a plurality of grids and plates, a common electron emitting means, a shield for the emitting means provided with openings to permit the passage of electrons and ions along the entire surface of the emitting means so as to supply emission to one plate at a time, and means to prevent stray ionization between the tube sections.

RICHARD U. CLARK.